(12) United States Patent
Babinski

(10) Patent No.: US 6,453,761 B1
(45) Date of Patent: Sep. 24, 2002

(54) DIRECT ATTACHMENT ELECTRIC MOTOR OPERATED BALL NUT AND SCREW LINEAR ACTUATOR

(75) Inventor: James A. Babinski, Saginaw, MI (US)

(73) Assignee: Thomson Saginaw Ball Screw Company, L.L.C., Saginaw, MI (US)

( * ) Notice: Subject to any disclaimer, the term of this patent is extended or adjusted under 35 U.S.C. 154(b) by 15 days.

(21) Appl. No.: 09/714,312

(22) Filed: Nov. 16, 2000

(51) Int. Cl.[7] ................................................ F16H 25/22
(52) U.S. Cl. .................. 74/89.34; 29/898.06; 74/89.39; 74/424.83; 74/424.84; 310/80
(58) Field of Search ..................... 74/89.34, 89.39, 74/424.84, 424.83; 29/898.06; 310/80

(56) References Cited

U.S. PATENT DOCUMENTS

| 2,444,886 A | 7/1948 | Vickers |
| 2,446,393 A | * 8/1948 | Russell ........................ 192/143 |
| 2,455,368 A | 12/1948 | Hoffar |
| 2,860,266 A | * 11/1958 | Schrader ................. 251/129.11 |
| 3,162,074 A | 12/1964 | Korthaus et al. |
| 5,467,661 A | 11/1995 | Lange |
| 5,467,662 A | 11/1995 | Lange et al. |
| 5,899,114 A | 5/1999 | Dolata et al. |

FOREIGN PATENT DOCUMENTS

WO    WO 99/02883    1/1999

* cited by examiner

Primary Examiner—Allan D. Herrmann
(74) Attorney, Agent, or Firm—Reising, Ethington, Barnes, Kisselle, Learman & McCulloch, P.C.

(57) ABSTRACT

A linear actuator comprises a ball screw carrying an axially restrained rotatable ball nut driven by an electrically energized motor. An enclosing motor housing has front and rear walls with axially aligned openings for passing the ball screw. The motor has a radially inner hollow stator assembly and a generally concentric radially outer rotor assembly. A can member is integrated with the rotor assembly to rotate therewith and has a radial end wall connected to the nut.

9 Claims, 4 Drawing Sheets

DIRECT ATTACHMENT ELECTRIC MOTOR OPERATED BALL NUT AND SCREW LINEAR ACTUATOR

The present invention is directed to ball screw and nut linear actuators and, more particularly, to those which are motor housing contained.

BACKGROUND OF THE INVENTION

Applicant is aware of Vickers U.S. Pat. No. 2,444,886, wherein a gear driven shaft is operated by the armature of the motor and revolves a nut in an extension of the motor housing which is trapped so that it cannot be moved axially. A screw shaft of limited extensibility operates in conjunction with the nut. In this patent, the exciting field is fixed to the interior of the motor housing and the armature is radially inward of the field and operates the gearing mechanism. The structure disclosed in the Vickers patent is not compact and does not provide a screw which is unlimited by the other mechanism in terms of its permissible axial travel.

SUMMARY OF THE PRESENT INVENTION

The present invention provides a linear actuator with a ball screw carrying a nut driven by an electrically energized motor which has an enclosing motor housing with both front and rear walls having aligned openings for axially passing the extensible ball screw. The helical grooves and lands formed in the nut and screw provide a helical ball raceway or raceways in which load bearing balls circulate in the usual manner. The electric motor integrated with the housing includes an inner stator assembly and an outer rotor assembly, and a partially enclosing can member integrated with the rotor assembly to rotate therewith. The rotating can has a radial wall with a driving connection to the nut. Two embodiments of the invention are illustrated in which the rotating can radial wall is attached to an end portion of the nut. In one case, the nut is concentrically located with respect to the stator assembly and the rotor assembly and, in the other, the nut is in line with the stator winding assembly.

One of the prime objects of the present invention is to provide a compact linear actuator of the type mentioned wherein the screw axial travel is limited only by the length of the screw.

A further object of the invention is to provide a linear actuator which is well adapted to use in a wide variety of applications, particularly where space requirements dictate that the linear actuator be compact and fit into restricted spaces.

Still another object of the invention is to provide a linear actuator which, in one embodiment, is well suited to accommodating side loads as well as axial loads.

A still further object of the invention is to design a linear actuator of relatively simple character which is economical to manufacture and market, and yet is durable in use and requires only a modicum of maintenance attention.

Other objects and advantages of the invention will become apparent with reference to the accompanying drawings and the accompanying descriptive matter.

BRIEF DESCRIPTION OF THE DRAWINGS

The presently preferred embodiments of the invention are disclosed in the following description and in the accompanying drawings, wherein.

DETAILED DESCRIPTION

Figure 1:
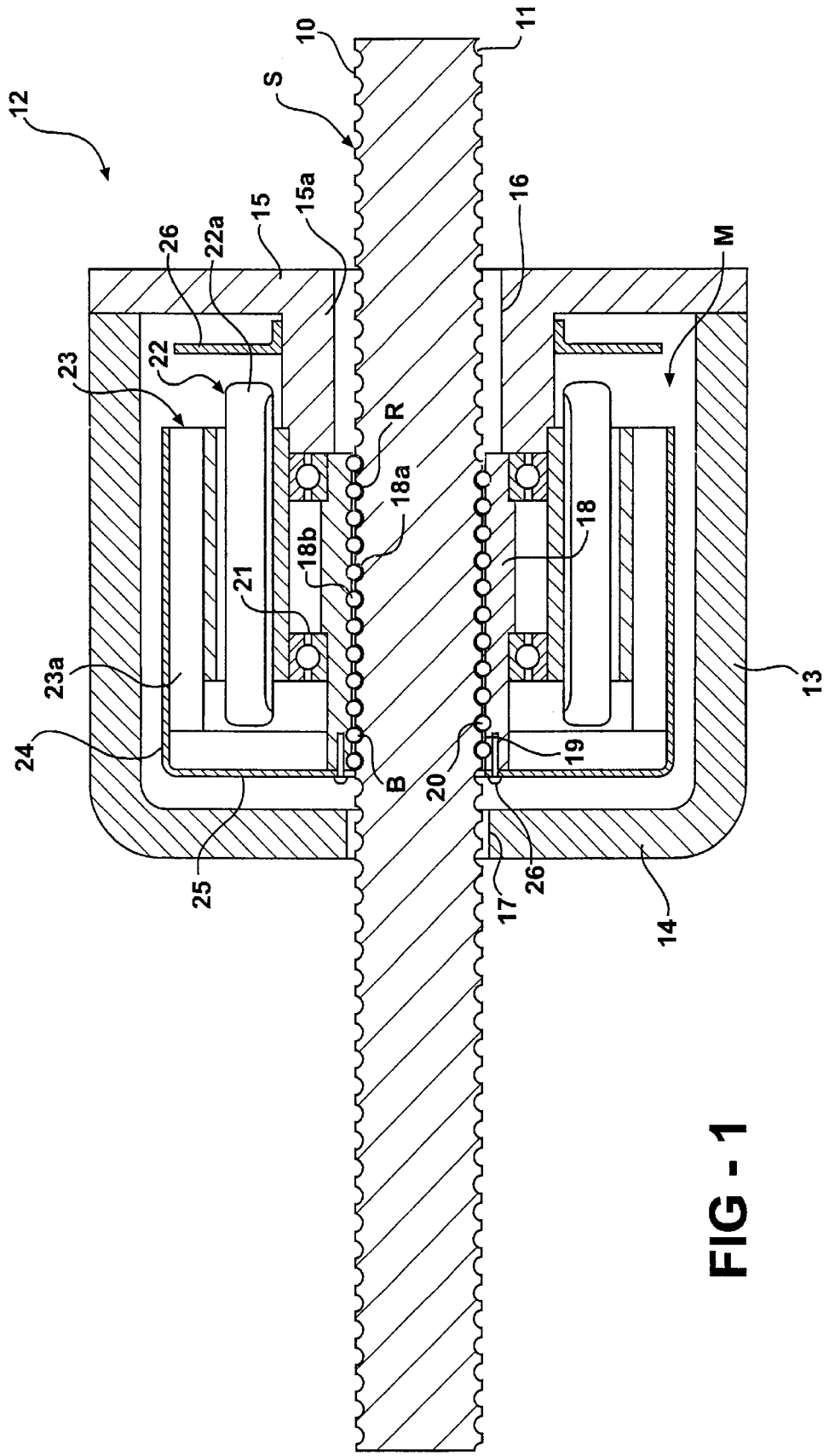
FIG. 1 is a schematic sectional side elevational view of one embodiment of the motor and actuator assembly.

Referring now particularly to the accompanying drawings and, in the first instance to FIG. 1, the linear actuator depicted includes a screw S having the usual helical lands 10 and helical grooves 11. The screw S may be a hollow, rolled thread ball screw. The fully enclosing motor housing, generally designated 12, is shown as comprising an annular wall 13, with an integrated end wall 14, which provides a cup-shaped motor housing element. Secured to the open end of the cup-shaped member, as with screws or the like, is an end plate 15 which has an axially inwardly extending tubular wall 15a forming an annular opening 16. Opposite the opening 16, the motor housing wall 14 has an opening 17 and, plainly, the screw S extends freely through the walls 14 and 15, which do not restrict its axial travel.

The ball nut 18, which similarly has helical lands 19 and helical grooves 20, conjunctively operates with the screw S to provide a ball circuit raceway R for the circulation of balls B in the usual manner. Typically, the ball nut 18 will have a conventional internal ball return system. This could be of the type disclosed in Babinski U.S. Pat. No. 5,193,409 or consist of essentially a plurality of single turn ball return inserts in which the ball return members may be of the character disclosed in U.S. Pat. No. 5,937,700, for example. Both of these patents are incorporated herein by reference.

It will be seen that the nut 18 mounts radial ball bearings 21, which support the stator assembly, generally designated 22, concentrically with the axially fixed, but rotatable, nut 18. The conventional stator assembly will not be particularly described, but includes the exciting field circuitry 22a which, when energized, rotates the rotor assembly, generally designated 23. It is to be understood that rotor assembly comprises the usual electromagnets 23a fixed at circumferentially spaced intervals to the interior of an annular can body 24, which operates as an enclosure for the rotor assembly and has an end radial wall 25. Wall 25 attaches to the end of the nut 18 as with retention screws 26.

The reversible motor M comprising the stationary stator and the revolvable rotor is a commercially available D.C. motor of the brushless variety wherein commutation is accomplished by an on-board electronic circuit board 26. The motor used could be a shunt type or a compound type. The motor elements may be said to comprise a D.C. motor of the outside spin variety. The linear actuator nut elements and the motor elements are axially retained within the overall motor housing and provide a compact package to drive a ball screw capable of lifting a variety of typical payloads.

It is important to understand that the self-contained actuator eliminates the use of gears, belts, pulleys, etc. and need not provide a drive shaft to drive the nut. The motor provides increased torque, because the greater diameter stator and rotor assemblies are of greater circumference than the prior art motors which typically drive ball nuts, and accommodate a greater number of windings and magnets to provide increased torque.

Figure 2:
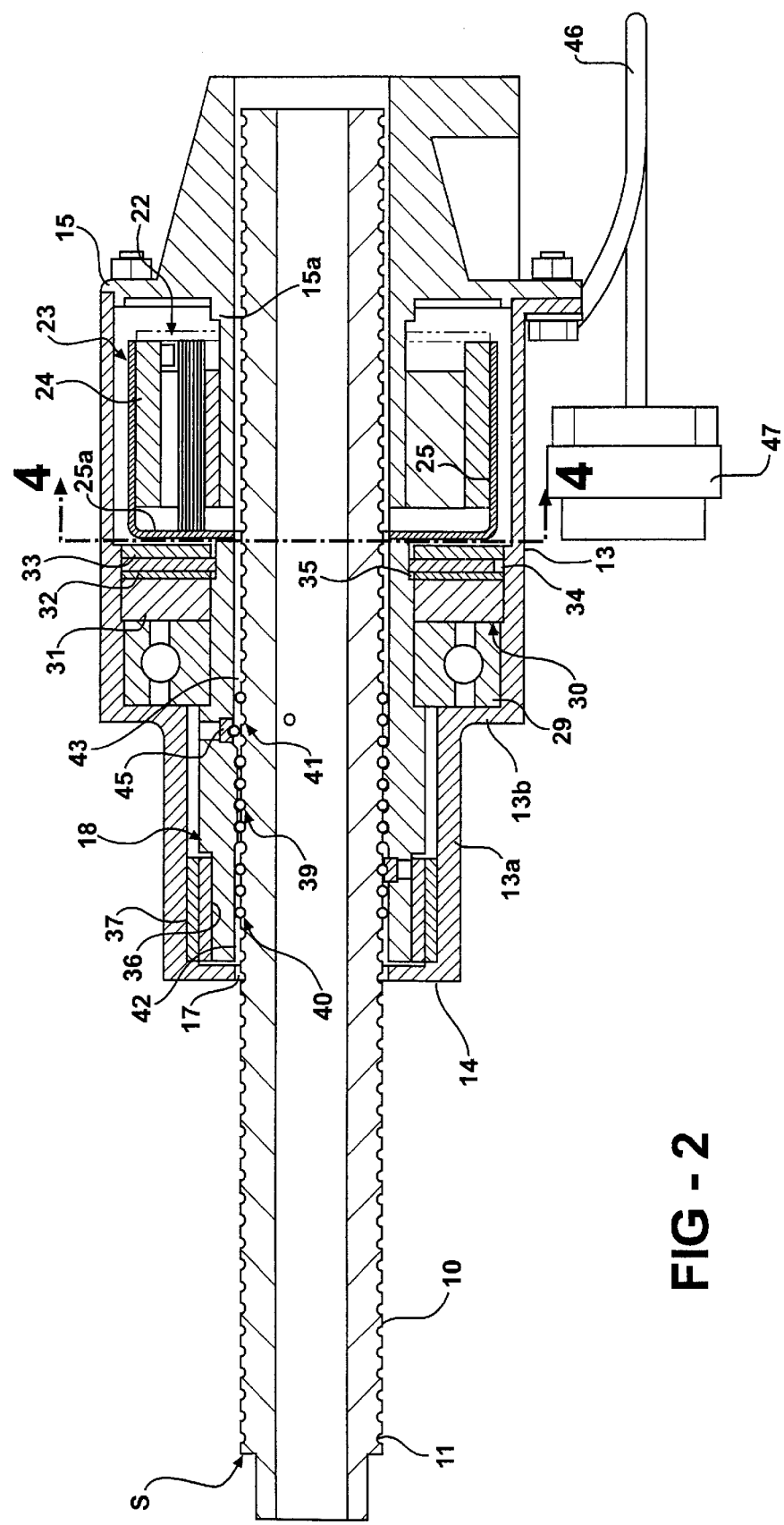
FIG. 2 is a similar view of a further embodiment.
Figure 3:
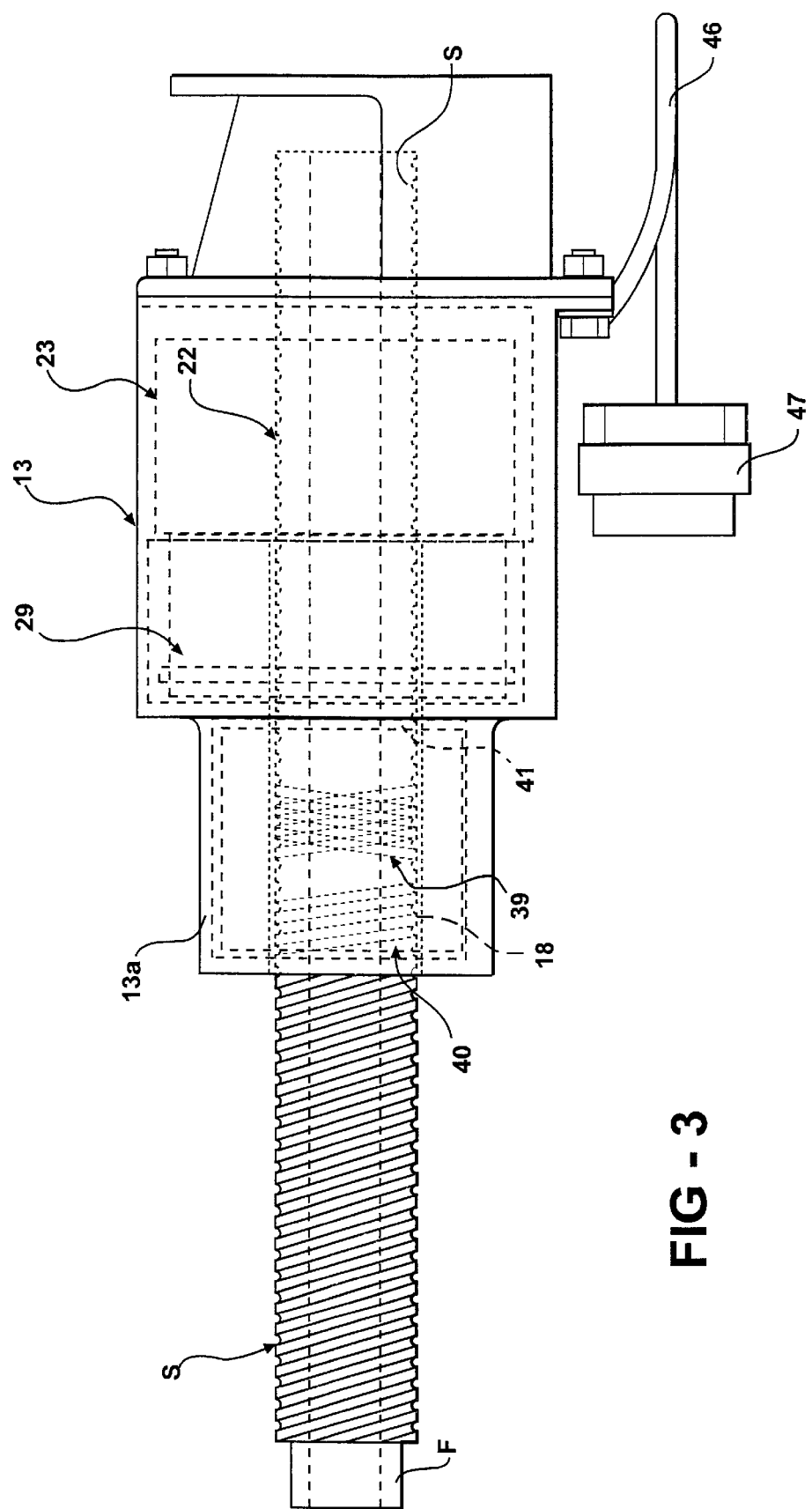
FIG. 3 is a schematic exterior side elevation view thereof.
Figure 4:
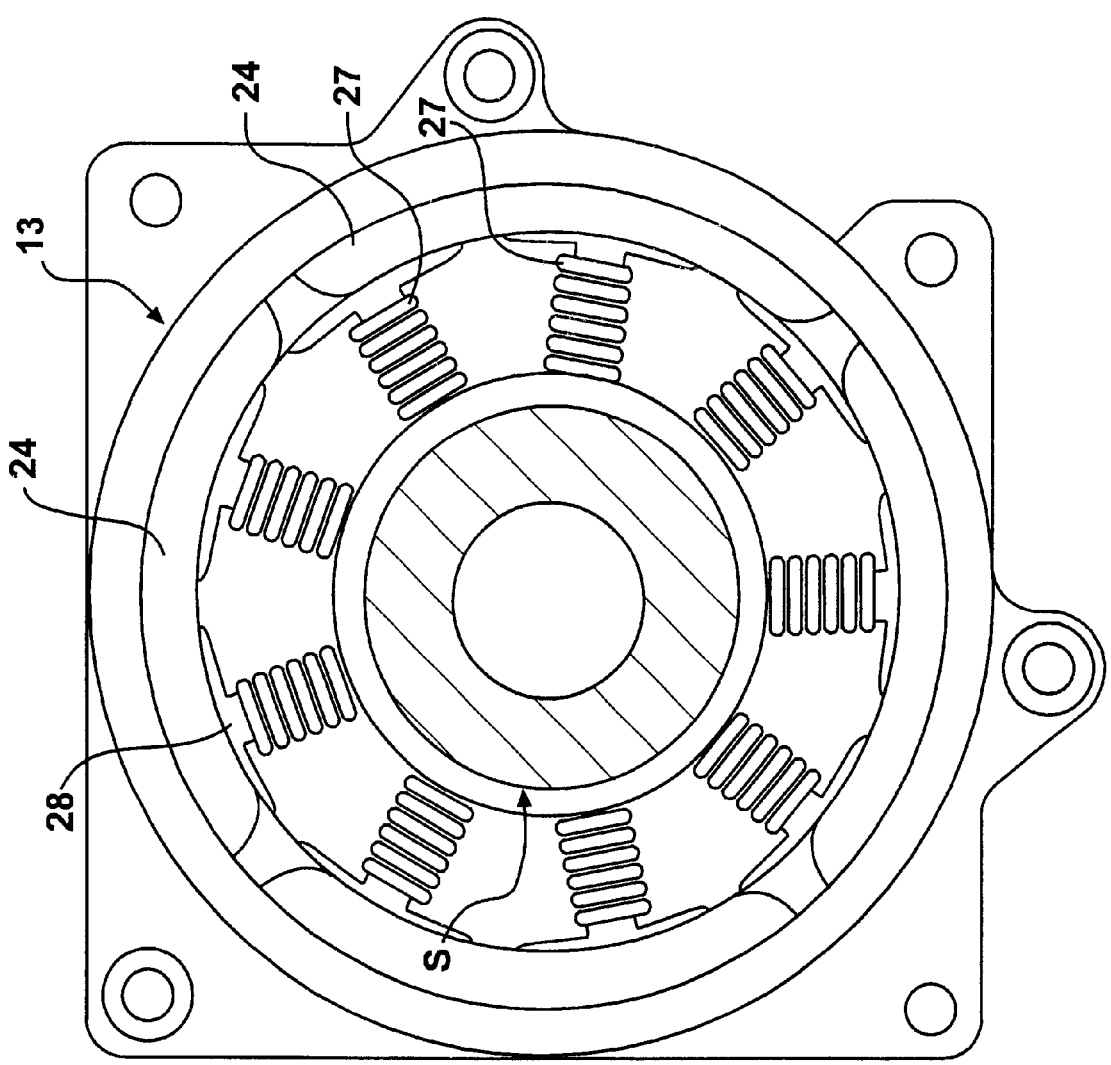
FIG. 4 is a schematic cross-sectional view taken on the line 4—4 of FIG. 2.

FIGS. 2–4 disclose an embodiment in which like numerals and letters are used to identify like parts. In this embodiment, the nut 18 is in an inline position with respect to the motor stator assembly. Here, the motor housing sleeve 13 is provided with a reduced diameter housing extension 13a extending from a shouldered portion 13b. The end wall 14, as previously, is provided with the opening 17 to permit the axial passage of the screw S. The motor elements, as previously, include the stator assembly 22 and the rotor assembly 23. In this version, the stator assembly 22 is fixed on the stationary sleeve portion 15a of the housing end plate 15.

As FIGS. 3 and 4 indicate, the stator assembly 22 has a plurality of field or exciter windings 27 mounted on the usual posts 28. The rotor assembly electromagnets are shown at 24 in the normal circumferentially spaced relation. The nut 18, which is elongated to receive a plurality of balls circuits of different character, is in line with the stator assembly 22 and, it will be noted, that the can radial wall 25 attaches to its axially inner end wall at 25a. Provided within the motor housing adjacent shouldered portion or wall 13b is an axially restrained ball bearing assembly 29 or roller bearing ring which seats in the recess formed by housing shoulder 13b and is spaced from the can wall 25 to provide a space for an optional brake, generally designated 30, which may be of conventional character. Electrically operating brake 30 may be of any conventional character including spring set solenoid, band style, drum and pressure pad, disc type, and rap spring design, which can be employed for load stoppage or position holding as during a power loss situation. As shown, the brake is of the spring set solenoid variety and incorporates solenoid coils 31, holding or spacer retainer discs 32 and 33 and a friction disc 34, which can be moved by the springs into operative engagement with a braking surface 35 provided on the nut 18. Since any one of a number of different types of brakes can be used, and all are of conventional character, the present brake will not be more particularly described. At its extended end, the housing 13a is exteriorly flanged as at 36 to receive needle rollers constituting a roller bearing 37 in circumferentially spaced relationship to provide a needle bearing assembly bearing upon the interior of motor housing wall 13a.

In this embodiment the nut 18 and screw 11 have ball circuits, shown generally at 38 and comprised of an intermediate circuit 39 bounded by end ball circuits 40 and 41. Circuit 39 is formed between the nut lands and grooves 18a and 18b and the screw lands and grooves 10 and 11, respectively, to provide axial thrust capability moving the screw S in an axial direction. As previously, the balls B, which travel in these circuit in the intermediate circuit 39, are internally returned by internal ball return mechanisms. On either side of the intermediate circuit portion 39 are side load reacting ball circuit portions 40 and 41 wherein the balls B, traveling in these circuits, do not engage in nut groves, but rather bear upon the nut smooth annular surfaces 42 and 43.

Attention is directed to applicant's assignees U.S. Pat. No. 5,467,662, which is incorporated herein by reference and which, in FIG. 5, discloses the configuration of the nut and screw grooves for the ball circuit or circuits shown in FIG. 1 and in the intermediate portion 39 in FIG. 2. The screw grooves, of course, will also be capable of absorbing or reacting with side loads when the balls B engage the non-grooved smooth annular walls 42 and 43 of the nut.

In FIG. 2, the numeral 45 indicates individual ball return inserts which are of the type used to internally return the balls in the ball circuits of portions 40 and 41. It is anticipated that these circuits will be of the essentially single-turn variety mentioned previously.

The electrical cord, identified at 46, connects to the stator field windings and leads to a plug 47.

THE OPERATION

In both FIG. 1 and FIGS. 2–4, when electric current is supplied to the stator assembly coils, the rotor assemblies are energized to drive the nuts 18. In each instance, the balls B circulate and are appropriately returned. In the FIG. 2 embodiment, the balls B in intermediate section 39 operate in the same manner as the balls B in FIG. 1 to provide the axial thrust moving the screw S axially in either direction, dependent upon the direction of rotation of the rotor assembly and the nut 18. It is to be understood that the motors illustrated are of the reversible character wherein nuts 18 can be rotated in a reverse direction also to move the screw S in a reverse direction.

In the FIGS. 2–4 embodiment, the balls B in the ball circuitry portions 40 and 41 further react with side loads, which may be imposed on the screw S and provide reacting capability when the side loads applied to the screw S are substantial. In both embodiments of the invention, the screw S may be prevented by the member which it drives from rotating. In FIG. 3, a fitting F can function to attach to the load member being moved.

The disclosed embodiment is representative of a presently preferred form of the invention, but is intended to be illustrative rather than definitive thereof. The invention is defined in the claims.

I claim:

1. A linear actuator with a ball screw carrying a nut driven by an electrically energized motor, there being helical grooves and lands formed in said nut and screw to provide a helical ball raceway in which balls circulate, said actuator comprising:
   a. an enclosing motor housing with front and rear walls having axially aligned openings for freely passing the ball screw to extend in both directions;
   b. an outside spin electric motor integrated with said housing and including a radially inner hollow stator assembly and a generally concentric radially outer rotor assembly;
   c. a ball nut carried within said motor housing on said screw in a manner to prevent its axial travel while permitting its rotation; and
   d. a can member enclosure integrated with the rotor assembly to rotate therewith having a radially inwardly extending wall connected to the nut.

2. The actuator of claim 1 wherein said nut is concentrically disposed with said rotor and stator assemblies radially inwardly thereof, and a bearing device is disposed radially between said nut and stator assembly.

3. The actuator of claim 1 wherein said housing has a shouldered portion defining a reduced diameter housing extension and said nut is at least partly received in said housing extension; said nut is axially in line with said stator assembly, a bearing extends axially at the axially outer end of said nut between said nut and housing extension; and a bearing ring is received adjacent said shouldered portion between said nut and housing.

4. The actuator of claim 3 wherein said nut grooves and lands provide a helically threaded surface and are bounded by smooth surfaced axially extending ball engaging portions, the threaded surface providing a nut portion wherein axial thrust is imparted to said screw, and said smooth profaced portions interacting with said screw grooves to on side smooth surfaced portions of said nut to better absorb side load.

5. The actuator of claim 3 wherein said bearing ring is axially spaced from said can radial wall and a brake which can brake said nut is situated in said space.

6. A method of constructing a linear actuator with a ball screw carrying a nut driven by an electrically energized motor, there being helical grooves and lands formed in said nut and screw to provide a ball raceway in which balls circulate, the method comprising:

a. providing an enclosing motor housing with front and rear walls having axially aligned openings for passing the ball screw;

b. providing an outside spin electric motor including a radially inner stator assembly and a generally concentric radially outer rotor assembly;

c. mounting a ball nut within said motor housing on said screw in a manner to prevent its axial travel while permitting its rotation;

d. passing said ball screw through one of said housing walls and threading it through said nut and on out the opening in the other housing wall;

e. providing a can member enclosure having a radial end wall integrated with the motor assembly to rotate therewith; and f. connecting said radial end wall with the nut.

7. The method of claim 6 including concentrically disposing said rotor and stator assemblies and disposing a bearing radially between said nut and stator assembly.

8. The method of claim 6 including mounting said nut axially in line with said stator assembly and providing bearings at each end of said nut between said nut and housing.

9. The method of claim 8 including providing said screw and nut with multiple ball circuit raceways, the raceways including an intermediate raceway portion wherein axial thrust is imparted to said screw, bounded by end raceway portions in which the balls therein bear on non-grooved portions of said nut to absorb side load.

* * * * *